(12) United States Patent
Tsai et al.

(10) Patent No.: US 8,164,581 B2
(45) Date of Patent: Apr. 24, 2012

(54) OPTICAL TOUCH MODULE

(75) Inventors: Wen-Ji Tsai, Taipei County (TW);
Bo-Ren Yan, Taichung County (TW);
Bo-Yi Wu, Taipei County (TW);
Jung-Wen Chang, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 378 days.

(21) Appl. No.: 12/551,634

(22) Filed: Sep. 1, 2009

(65) Prior Publication Data
US 2010/0309144 A1 Dec. 9, 2010

(30) Foreign Application Priority Data
Jun. 9, 2009 (TW) .............................. 98210235 U

(51) Int. Cl.
*G06F 3/042* (2006.01)
(52) U.S. Cl. ........................................ 345/175; 345/173

(58) Field of Classification Search .................. 345/173, 345/175; 178/18.09
See application file for complete search history.

(56) References Cited

U.S. PATENT DOCUMENTS

| | | | |
|---|---|---|---|
| 6,285,359 B1 * | 9/2001 | Ogasawara et al. | 345/175 |
| 6,480,187 B1 * | 11/2002 | Sano et al. | 345/175 |
| 6,838,657 B2 * | 1/2005 | Iwamoto et al. | 250/221 |
| 6,992,659 B2 * | 1/2006 | Gettemy | 345/173 |
| 2005/0243070 A1 * | 11/2005 | Ung et al. | 345/176 |

* cited by examiner

*Primary Examiner* — Adam R Giesy
(74) *Attorney, Agent, or Firm* — Thomas|Kayden

(57) ABSTRACT

An optical touch panel includes a frame, a first and a second image capture units, a first and second light sources, a first reflective element and a block element. The first and second image capture units are disposed on the frame and respectively disposed adjacent to the first and second light sources. The line between the first and second light sources defines a first connecting line. The reflective element disposed on a first side of the frame has a top point. The line between the top point and the second image capture unit defines a second connecting line. The block element blocks the first connecting line, but does not block the second connecting line.

12 Claims, 4 Drawing Sheets

OPTICAL TOUCH MODULE

CROSS REFERENCE TO RELATED APPLICATIONS

This application claims priority of Taiwan Patent Application No. 098210235, filed on Jun. 9, 2009, the entirety of which is incorporated by reference herein.

BACKGROUND OF THE INVENTION

1. Field of the Invention

The invention relates to an optical touch module, and more particularly to an optical touch module utilizing an image capture unit to determine touch signals.

2. Description of the Related Art

Conventional touch modules are usually resistance type touch modules due to cost considerations. Meanwhile, other developed touch module technologies include infrared, ultrasonic and surface capacitive type technologies. Currently, large sized touch panels are popular. Of the new technologies, optical touch modules utilizing image capture units for multiple touch points have been disclosed.

FIG. 1 is a schematic view of a conventional optical touch module. Referring to FIG. 1, the conventional optical touch module 10 comprises a touch panel 11, two image capture units 12 and 13, three reflective elements 14, 16 and 17 and a frame 15. The image capture units 12 and 13 are respectively disposed on the right corner and the left corner of the touch panel 11. Light sources 18 and 19 are respectively disposed adjacent to the image capture units 12 and 13. For example, the light sources 18 and 19 emit infrared rays, and the infrared rays are reflected along an initial path via the reflective elements 14, 16 and 17. The image capture units 12 and 13 capture the reflected light to determine touch signals.

However, the above optical touch module 10 has disadvantages. First, because the reflective elements 14, 16 and 17, and the image capture units 12 and 13 are directly disposed or fixed on the touch panel 11, the touch panel 11 is easily damaged and broken while re-working and repairing.

Additionally, referring to FIG. 1, as shown, light from the left light source 18 directly enters the right image capture unit 13 shown as arrow A1. Similarly, light from the right light source 19 directly enters the left image capture unit 12 shown as arrow A2. Thus, because light of the light sources directly enter the opposite image capture units, sensors (not shown) thereof may result in blooming phenomenon, wherein signals thereof are wrongly determined and noise is generated.

Moreover, if light from the light source 19 at the top right corner is partially reflected to the image capture unit 12 at the top left corner (shown as arrow B), signals thereof may be wrongly determined and noise may be generated. Similarly, if light from the light source 18 at the top left corner is partially reflected to the image capture unit 13 at the top right corner via the reflective element 14 adhered to the lower side, signals thereof may be wrongly determined and noise may be generated.

In summary, the structure of the optical touch module 10 may make the touch panel 11 broken while re-working and repairing, and make signals being wrongly determined due to the reflected light.

BRIEF SUMMARY OF THE INVENTION

The invention provides an optical touch module comprising a frame, a first image capture unit, a second image capture unit, a first light source, a second light source, a first reflective element, and a block. The first image capture unit is disposed on the frame. The first light source is disposed adjacent to the first image capture unit. The second light source is disposed adjacent to the second image capture unit. The first light source and the second image capture unit form a first connecting line. The first reflective element is disposed on a first side of the frame, and comprises a top point. The top point and the second image capture unit form a second connecting line. The block blocks the first connecting line but does not block the second connecting line.

Note that the optical touch module further comprises a second reflective element disposed on a second side of the frame. The second side of the frame is disposed adjacent to the first side of the frame.

Note that the second reflective element is disposed on the second side of the frame at an inclined angle.

Note that the inclined angle ranges from 3-10 degrees.

Note that the block comprises a supporting portion and a blocking portion. The supporting portion is connected to the blocking portion to form a T shape.

Note that the optical touch module further comprises a decorative member disposed between the first reflective elements and the frame and between the second reflective elements and the frame.

Note that the first and second reflective elements are disposed between the frame and a decorative member.

Note that the decorative member comprises a material that is previous to light.

Note that the first light source and the second light source comprise light emitting diodes.

BRIEF DESCRIPTION OF DRAWINGS

The invention can be more fully understood by reading the subsequent detailed description and examples with references made to the accompanying drawings, wherein.

The invention can be more fully understood by reading the subsequent detailed description and examples with references made to the accompanying drawings.

DETAILED DESCRIPTION OF THE INVENTION

Figure 1:
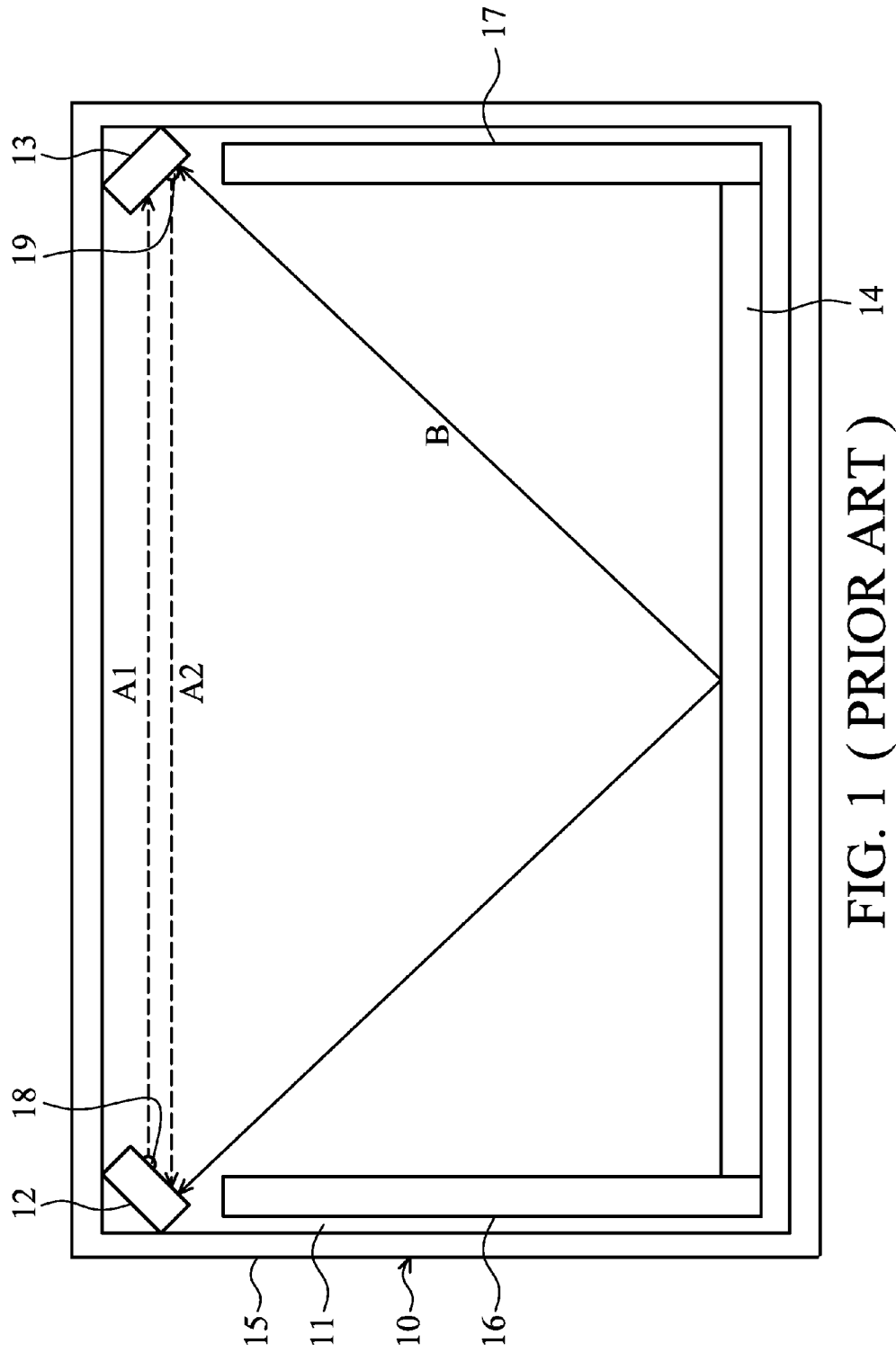
FIG. 1 is a schematic view of a conventional optical touch module.
Figure 2:
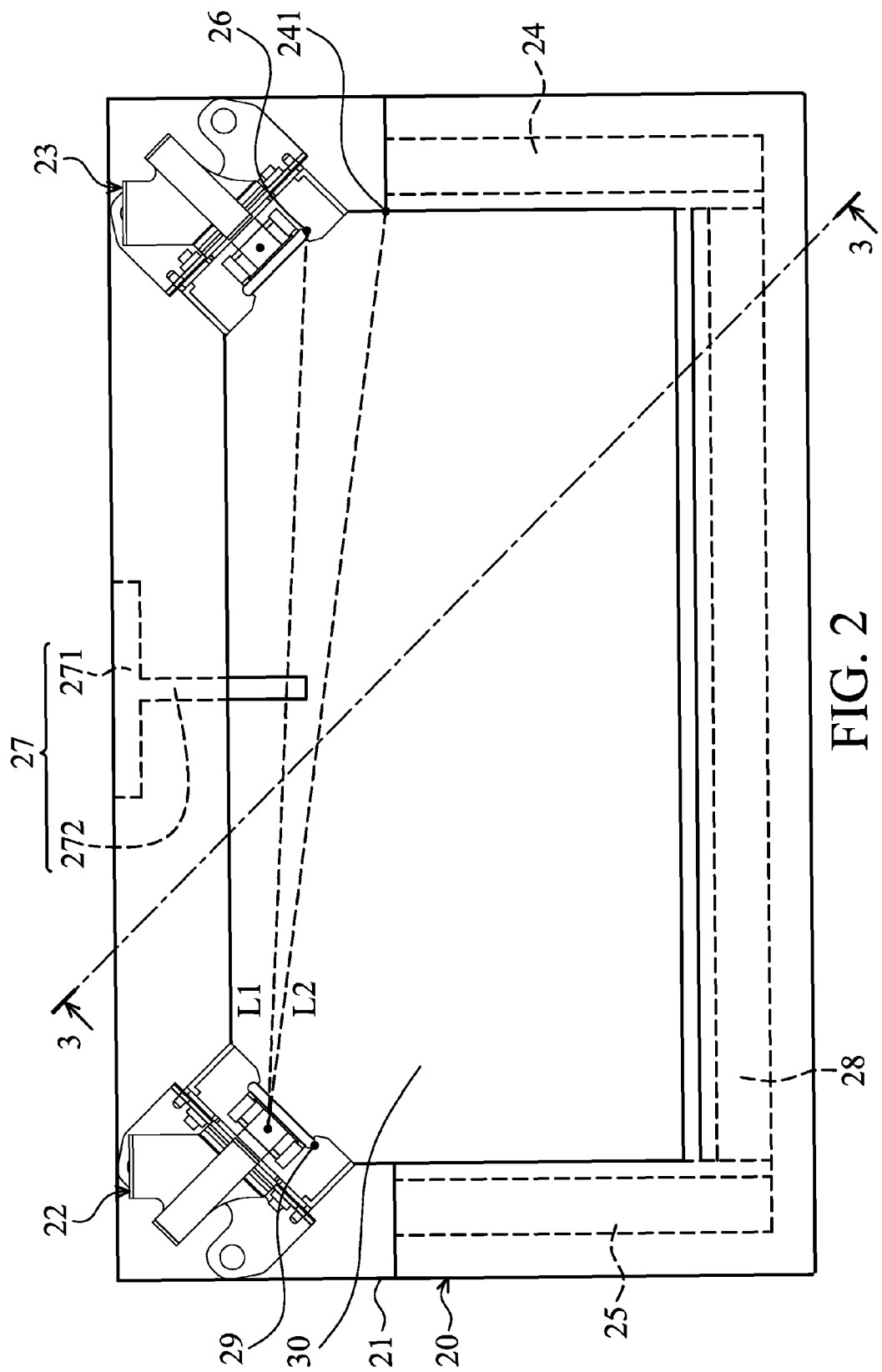
FIG. 2 is a schematic view of an optical touch panel of the invention.

FIG. 2 is a schematic view of an optical touch panel of the invention.

Referring to FIG. 2, the optical module 20 comprises a frame 21, a first and a second image capture units 22 and 23, a first and a second reflective elements 24 and 25, a block 27, a lower reflective element 28, a first and a second light sources 29 and 26, and a touch panel 30. The frame 21 surrounds the touch panel 30. The first image capture unit 22 and the second image capture unit 23 are respectively disposed at a position of the frame 21. In this embodiment, the first image capture unit 22 and the second image capture unit 23 are respectively disposed at a top left corner and a top right corner of the frame 21. The block 27 is disposed on the frame 21 and approximately disposed at the central area of an upper side of the frame 21 to block light from the second light source 26 from directly entering the first image capture unit 22, and block light from the first light source 29 from directly entering the second image capture unit 23. The first light source 29 and the second light source 26 are respectively disposed adjacent to the first image capture unit 22 and the second image capture unit 23. In this embodiment, the first and second light sources 29 and 26 are light emitting diodes. The first and second reflective elements 24 and 25, and the lower reflective element 28 are a single member or one piece.

Note that the first reflective element 24 is disposed adjacent to the second image capture unit 23. The first reflective element 24 comprises a top point 241. The block 27 comprises a supporting portion 271 and a blocking portion 272. In this embodiment, the supporting portion 271 is connected to the blocking portion 272 to form a T shape. The block 27 blocks a first connecting line L1 formed by the first image capture unit 22 and the second light source 26 but the block 27 does not block the second connecting line L2 formed by the top point 241 of the first reflective element 24 and the first image capture unit 22 so as to prevent the normal operation of the optical touch module 20.

Referring to FIG. 2, the top of the blocking portion 272 of the block 27 is disposed at an area between the first connecting line L1 and the second connecting line L2. The block 27 ensures that light from the first light source 29 does not directly enter the second image capture unit 23. Additionally, light from the first light source 29 is reflected to the first image capture unit 22 via the first reflective element 24 or the lower reflective element 28 of the frame 21. Similarly, light from the second light source 26 does not directly enter the first image capture unit 22, and light from the second light source 26 is reflected to the second image capture unit 23 via the second reflective element 25 or the lower reflective element 28 of the frame 21. Because light from the first light source 29 and the second light source 26 do not directly enter the second image capture unit 23 and the first image capture unit 22 respectively, the blooming phenomenon does not occur, and signals could be correctly determined and noise does not occur.

Figure 3:
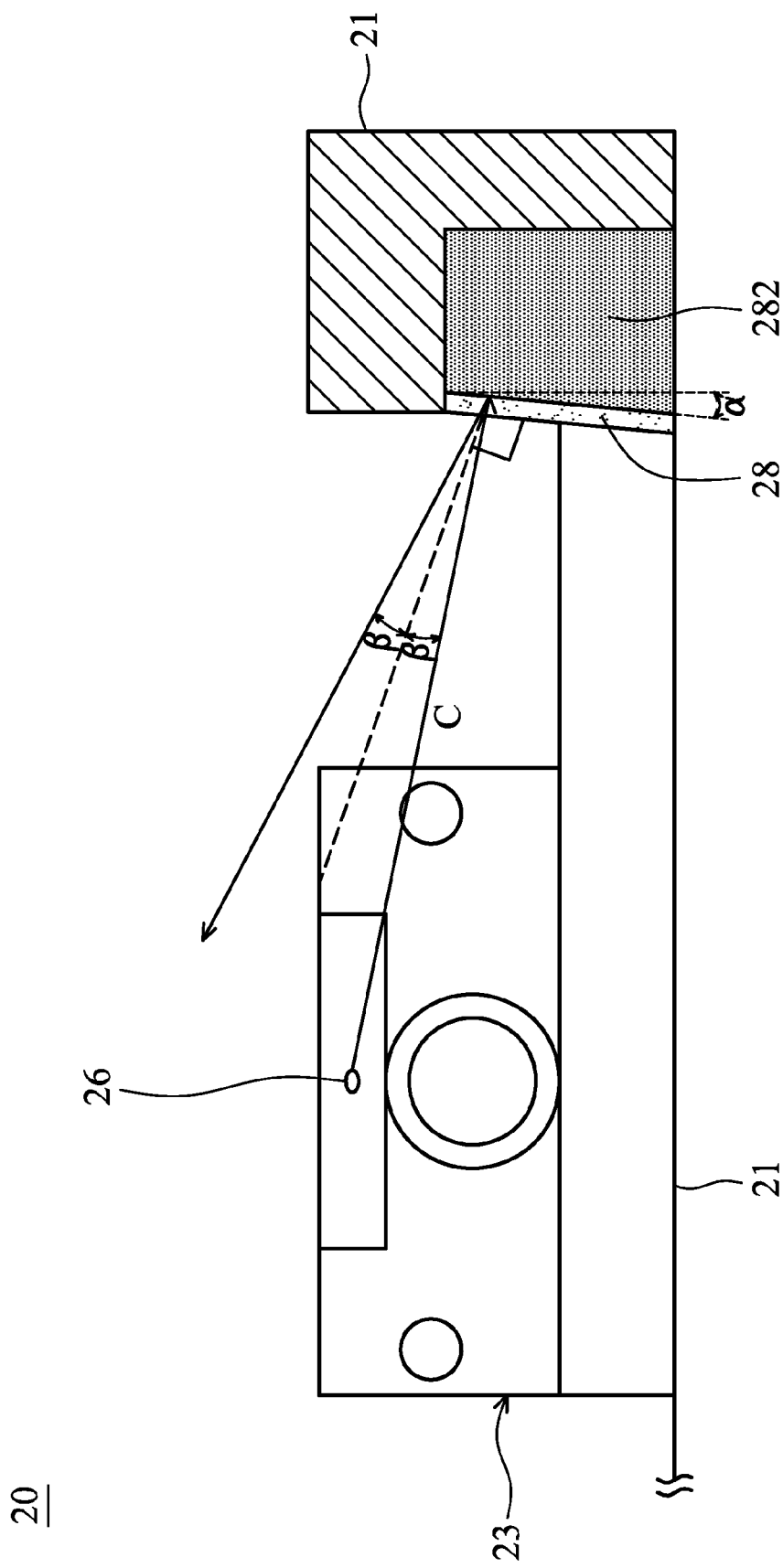
FIG. 3 is a cross-section view along the cross line 3-3 of FIG. 2.

FIG. 3 is a cross-section view along the cross line 3-3 of FIG. 2.

Referring to FIGS. 2 and 3, the lower reflective element 28 is disposed corresponding to the first image capture unit 22 and the second image capture unit 23. Referring to FIG. 3, the lower reflective element 28 is obliquely disposed at an inclined angle α on the frame 21, thus, the lower reflective element 28 has an inclined surface. In this embodiment, the inclined angle α ranges from 3-10 degrees. The inclined lower reflective element 28 allows light from the light sources 26 and 29 to be reflected to a direction away from the touch panel 30, so that light travels away from the surface of the touch panel 30. After light from the second light source 26 is reflected by the lower reflective element 28, light does not enter the first image capture unit 22. After light from the first light source 29 is reflected by the lower reflective element 28, light does not enter the second image capture unit 23. Referring to FIGS. 2 and 3, because the lower reflective element 28 has an inclined surface, when light from the second light source 26 along an arrow C is reflected by the lower reflective element 28, light is reflected upward at an angle β (away from the surface of the touch panel 30). Thus, after reflection, light from the second light source 26 does not enter the first image capture unit 22. Similarly, after reflection, light from the first light source 29 does not enter the second image capture unit 23.

In this embodiment, the optical module 20 further comprises a decorative member 282 for fixing the lower reflective element 28 firmly, and improving appearance. Shown in FIG. 3, the decorative member 282 is firstly connected to the frame 21 with one side and then connected to the lower reflective element 28 with another side. That is, the decorative member 282 is disposed between the frame 21 and the lower reflective element 28. Thus, fixing lower reflective element 28 with the frame 21 is strengthened.

Figure 4:
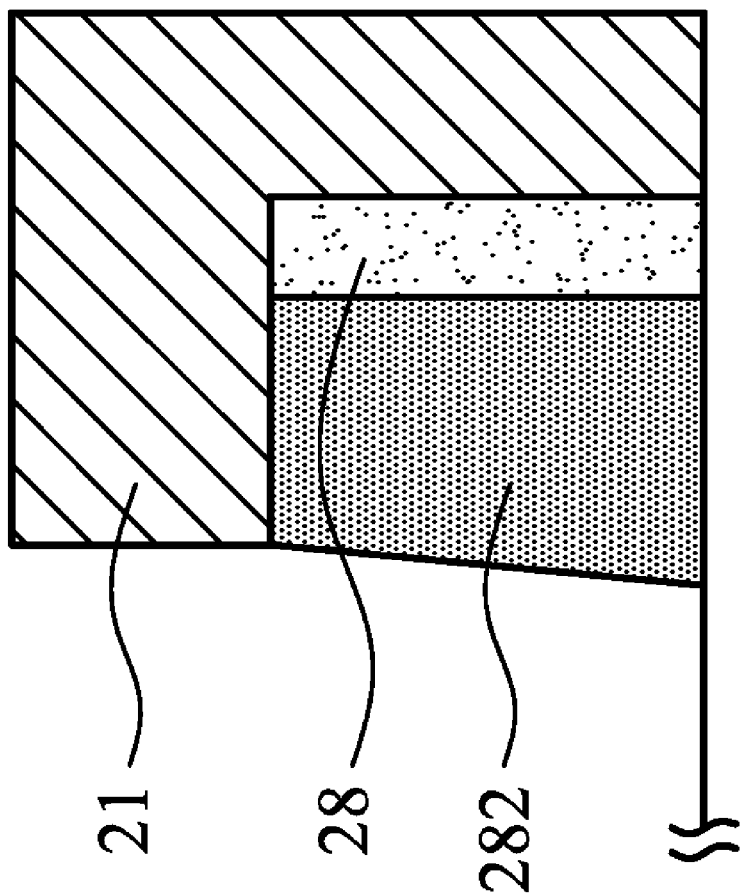
FIG. 4 is a schematic view of an optical touch panel of another embodiment of the invention.

FIG. 4 is a schematic view of an optical touch panel of another embodiment of the invention. The difference from FIG. 3 is that the lower reflective element 28 is firstly connected to the frame 21 with one side and then connected to the decorative member 282 with another side, that is, the lower reflective element 28 is disposed between the frame 21 and the decorative member 282. The decorative member 282 installed on the frame 21 improves appearance. Note that the decorative member 282 comprises material that is previous to light so that light may pass through the decorative member 282 and be reflected by the lower reflective element 28.

In summary, the optical touch module 20 comprises a first image capture unit 22, a second image capture unit 23, a first reflective element 24, a second reflective element 25, a block 27 and a lower reflective element 28 disposed on a frame 21. When the optical touch module 20 is re-worked or repaired, the optical touch panel is not easily damaged or broken, thus, raising product yields.

In the optical module 20 of the invention, the block 27 is installed on the frame 21 to block light from the first light source 29 and the second light source 26 from directly entering the second and first image capture units 23 and 22 respectively. Thus, the first and second image capture units 22 and 23 are not interfered by the second light source 26 and the first light source 29. Therefore, the blooming phenomenon does not occur, and signals could be correctly determined and noise does not occur.

The inclined lower reflective element 28 allows light from the first light source 29 and the second light source 26 to be reflected away from the surface of the panel. Thus, light from the first light source 29 and the second light source 26 is not reflected to the second image capture unit 23 and the first image capture unit 22 respectively. Thus, the first and second image capture units 22 and 23 are not interfered by the second light source 26 and the first light source 29. Therefore, the blooming phenomenon does not occur, and signals could be correctly determined and noise does not occur.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical touch module, comprising:
a frame;
a first image capture unit, disposed at a first position of the frame;
a second image capture unit, disposed at a second position of the frame, wherein the second position is adjacent to the first position;
a first light source, disposed adjacent to the first image capture unit, the first light source and the second image capture unit forming a first connecting line;
a second light source, disposed adjacent to the second image capture unit;
a first reflective element, disposed on a first side of the frame, wherein the first side is adjacent to the first image capture unit, the first reflective element comprises a top point, and the top point and the second image capture unit form a second connecting line;

a second reflective element, disposed on a second side of the frame at an inclined angle, wherein the second side is adjacent to the first side, the second reflective element has an inclined angle relative to a normal direction of the touch panel, and the inclined angle ranges from 3-10 degrees; and a block for blocking the first connecting line and the second connecting line is not being blocked by the block.

2. The optical touch module as claimed in claim 1, wherein the block comprises a supporting portion and a blocking portion, the supporting portion is connected to the blocking portion to form a T shape.

3. The optical touch module as claimed in claim 1, further comprising a decorative member disposed between the first reflective elements and the frame and between the second reflective elements and the frame.

4. The optical touch module as claimed in claim 3, wherein the decorative member comprises a material that is pervious to light.

5. The optical touch module as claimed in claim 1, wherein the first and second reflective elements are disposed between the frame and a decorative member.

6. The optical touch module as claimed in claim 1, wherein the first light source and the second light source comprises a light emitting diode.

7. The optical touch module as claimed in claim 1, wherein the block comprises a supporting portion and a blocking portion, and the supporting portion is connected to the blocking portion to form a T shape.

8. The optical touch module as claimed in claim 7, further comprising a decorative member disposed between the first reflective elements and the frame and between the second reflective elements and the frame.

9. The optical touch module as claimed in claim 7, wherein the first and second reflective elements are disposed between the frame and a decorative member.

10. The optical touch module as claimed in claim 9, wherein the decorative member comprises a material that is pervious to light.

11. The optical touch module as claimed in claim 10, wherein the first light source and the second light source comprises a light emitting diode.

12. The optical touch module as claimed in claim 11, wherein the inclined angle ranges from 3-10 degrees.

* * * * *